United States Patent [19]

Doyle

[11] Patent Number: 4,519,619
[45] Date of Patent: May 28, 1985

[54] HIGH TEMPERATURE RESISTANT GASKET HAVING IMPROVED RECOVERY CHARACTERISTICS

[75] Inventor: William D. Doyle, Elmhurst, Ill.

[73] Assignee: Felt Products Mfg. Co., Skokie, Ill.

[21] Appl. No.: 654,229

[22] Filed: Sep. 25, 1984

[51] Int. Cl.³ ............................................. F16J 15/12
[52] U.S. Cl. ................................ 277/235 B; 277/180; 277/DIG. 6
[58] Field of Search ................ 277/166, 180, 182–184, 277/186, 235 R, 235 A, 235 B, DIG. 6

[56] References Cited

U.S. PATENT DOCUMENTS

| 2,087,430 | 7/1937 | Cummins | 277/235 B X |
| 3,924,863 | 12/1975 | Nakano et al. | 277/235 B |
| 4,140,323 | 2/1979 | Jacobs | 277/235 B X |
| 4,325,559 | 4/1982 | Czernik et al. | 277/235 B |
| 4,397,472 | 8/1983 | Czernik | 277/DIG. 6 X |

FOREIGN PATENT DOCUMENTS

| 1917122 | 10/1970 | Fed. Rep. of Germany | 277/180 |
| 2101239 | 1/1983 | United Kingdom | 277/235 B |

*Primary Examiner*—Robert S. Ward
*Attorney, Agent, or Firm*—Dressler, Goldsmith, Shore, Sutker & Milnamow

[57] ABSTRACT

A gasket of improved compressibility and recovery characteristics, and high temperature resistance. The gasket has a central annular core having upper and lower generally flat face portions, and first and second annular sheet members having an upwardly projecting and downwardly facing annular embossment respectively, each defining a concave recess facing the associated flat face portion. The sheet members are secured to the core. A high temperature resistant filler material of high recovery characteristics is provided and trapped in each of the recesses in confronting relation to the respective flat face portions.

15 Claims, 6 Drawing Figures

HIGH TEMPERATURE RESISTANT GASKET HAVING IMPROVED RECOVERY CHARACTERISTICS

BACKGROUND OF THE INVENTION

A wide variety of gasket constructions are available for sealing in various environments, including high temperature environments. Many gasket constructions have automotive applications, as well as other more generalized applications.

One of the more popular high temperature resistant gasket constructions is the spiral wound gasket. This generally comprises an outer circumferential metal sheath and an intermediate winding of sheet material, such as an asbestos material, wound on an inner metallic sheath. Spiral wound gaskets are generally annular and define a central opening. Such a gasket is generally intended to seal against a pair of confronting flanges which define confronting openings which the gasket central opening is intended to surround. The sealing faces of the flanges act against the edges of the gasket to provide the seal. Spiral wound gaskets are expensive to fabricate. However, they may be constructed to have high temperature resistance and have relatively good recovery characteristics. As such, they are widely used in high temperature environments, and have application in some high-temperature, high pressure automotive environments.

Spiral wound gaskets do not easily lend themselves to use in automotive environments, in large measure because they do not easily or readily lend themselves to securement in gasket assemblies, or to precise positioning relative to the members to be sealed. As such, their use results in problems of maintaining alignment and overall assembly when gasket assemblies are to be juxtaposed in automotive engine environments.

Therefore, it would be of advantage to make available an improved high temperature-resistant gasket element which is readily assembleable in overall automotive gasket assemblies, to provide such a gasket element which is relatively simple to fabricate, and to provide such a gasket element which has substantially improved recovery characteristics.

A variety of gaskets have been developed to provide for increased compressibility and for improved recovery. One such patent, U.S. Pat. No. 4,397,472, discloses an improved cylinder bead gasket assembly, especially adapted to be positioned between an engine head and block, and particularly for sealing combustion cylinders in such an engine. That patent discloses the use of embossments and of flexible expanded graphite disposed in the embossments to provide enhanced combustion opening sealing. U.S. Pat. No. 4,397,472 discusses prior art embossments and fillers for gaskets, and prior art suggestions for the use of expanded graphite in high temperature, high stress applications.

SUMMARY OF THE INVENTION

In accordance with the present invention, there is provided a novel gasket having highly advantageous compressibility and recovery characteristics. In its preferred form, the gasket comprises a central annular core having upper and lower generally flat face portions, a first annular sheet member having an upwardly projecting annulus embossment defining a concave recess facing the upper flat face portion, a second annular sheet member having a downwardly projecting annular embossment defining a concave recess facing the lower flat face portion and means, such as welds, securing the first and second sheet members to the core. The gasket further comprises high temperature-resistant filler material of relatively high recovery characteristics in each of the recesses and trapped in the recesses in confronting relation to the respective flat face portions.

Preferably, the sheet members are metallic and define integral tab means which are secured to the core, as by welds. The sheet members may be identical. The filler may be flexible expanded graphite, and particularly expanded graphite which has a density of from about 70 to about 85 pounds per cubic foot.

At least one of the sheet members may define projecting ears which define means such as bolt holes for locating the gasket relative to bolts in the environments in which the gasket is to be used.

The gasket defines a central opening and may be used in a variety of environments, such as an individual gasket to seal a pair of confronting members. The gasket may also be integrated with an overall gasket assembly such as those having automotive applications in which the gasket is preferably disposed in an appropriately configured opening to position its central opening in line with the opening in the members to be sealed. Such gasket assemblies may include exhaust manifold outlet assemblies among others.

Further objects, features and advantages of the present invention will become apparent from the following description and drawings.

DESCRIPTION OF A PRESENTLY PREFERRED EMBODIMENT

Figure 1:
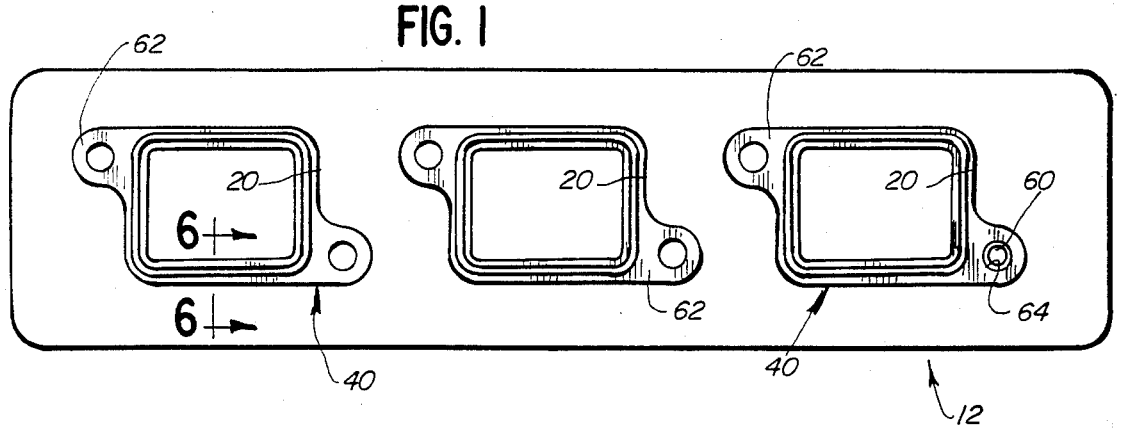
FIG. 1 is a plan view of a gasket assembly incorporating gasket elements in accordance with the present invention.
Figure 2:
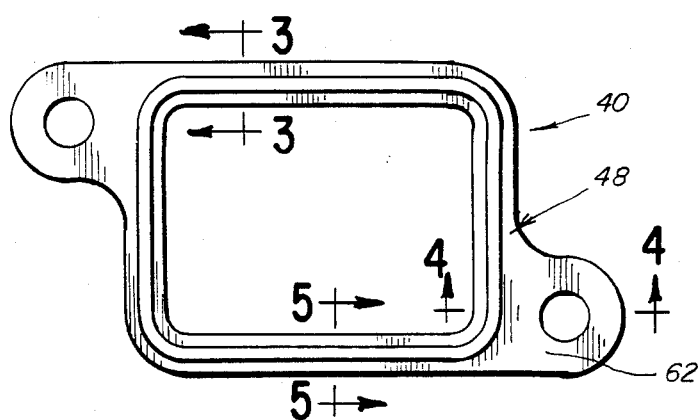
FIG. 2 is an enlarged plan view of a gasket element of the present invention.
Figure 3:
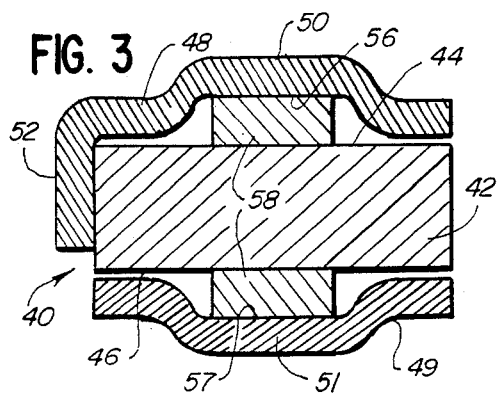
FIG. 3 is an enlarged cross-sectional view of the gasket element of FIG. 2 taken substantially along line 3—3 of FIG. 2.
Figure 4:
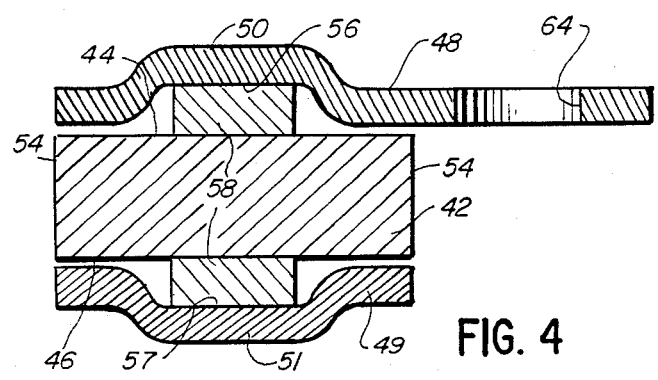
FIG. 4 is an enlarged cross-sectional view of the gasket element of FIG. 2 taken substantially along line 4—4 of FIG. 2.
Figure 5:
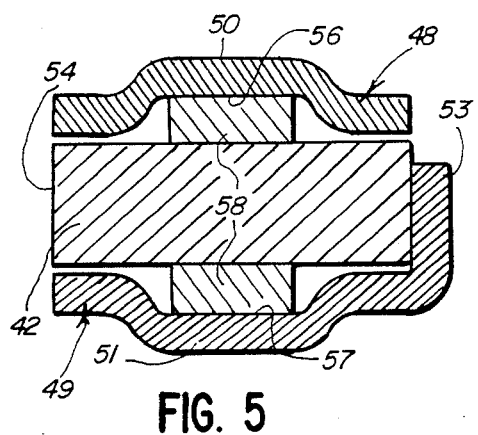
FIG. 5 is an enlarged cross-sectional view of the gasket element of FIG. 2 taken substantially along line 5—5 of FIG. 2.
Figure 6:
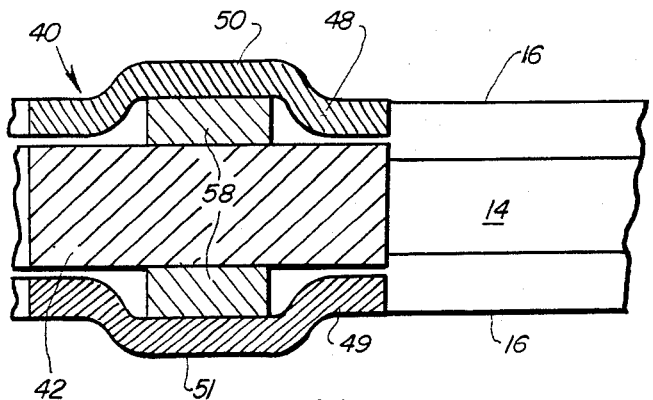
FIG. 6 is an enlarged cross-sectional view of the gasket assembly of FIG. 1 taken substantially along line 6—6 of FIG. 1.

Referring now to the drawings, FIG. 1 illustrates a gasket assembly 10, such as a gasket assembly adapted for use as an automotive exhaust manifold gasket. The gasket assembly 10 includes an elongated main body portion 12, comprising a central generally flat metallic core or base 14. The core 14 has generally flat upper and lower surfaces to which are secured composite gasket facings 16. Facings 16 are fiber reinforced-elastomer facings which are attached mechanically or adhesively to the main surfaces of the central core 14, such as by a conventional laminating process. The most popular and frequently used facings incorporate asbestos or glass fibers, and utilize nitrile, neoprene or polyacrylic elastomers to provide self-sustaining facings.

In the embodiment illustrated, the core 14 is of a thickness of about 0.020 inch and the facings 16 each have a thickness of about 0.020 inch. Generally, core thicknesses may range from about 0.010 to about 0.040 inch and the facings may range in thickness from about 0.010 to about 0.030 inch or more. The facings are generally so formulated and fabricated that they will resist degradation by oils and coolants, retain torque, minimize extrusion and exhibit sufficient heat resistance for the environment in which they are to be used.

The main gasket body 12 is die-cut or blanked out, such as with a stamping machine, punch press or other suitable form of equipment to provide the requisite number (at least one) of apertures or openings, such as the openings 20 and bolt holes. The openings 20 are disposed to be in line with openings in a pair of elements to be sealed by the gasket assembly. The openings 20 are adapted to receive supplementary sealing or gasket elements.

So far, the gasket assembly as described is typical of many of those used in a variety of environments, such as for the sealing of exhaust outlet manifolds.

In prior art environments, gasket elements such as spiral wound gaskets, have been provided for insertion in the openings 20 in exhaust outlet manifolds. In accordance with the present invention, improved gasket elements are provided for insertion in the openings 20 and for affixation, where desired, with the main body portion 12 of the gasket assembly 10 itself.

Referring now to FIGS. 2-6 in particular, annular gasket elements 40 in accordance with the present invention comprise a central core 42 which may be of cold-rolled steel and about 0.060 inch thick and about 0.25 inch wide. Core 42 is annular and continuous, and may be of any desired regular or irregular shape. Opposed faces 44, 46 of the core are provided with sheet elements such as annular sheet metal elements 48, 49 which define generally centrally located annular embossments 50, 51, respectively. The sheet metal elements may be about 0.015 inch thick 316 stainless steel, and conform in shape to the shape of the core annulus. Embossments 50, 51 open downwardly and upwardly, respectively to confront flat face portions or faces 44, 46. Sheet metal elements 48, 49 additionally define a plurality of integral securement tabs 52, 53 which confront side edges 54 of the core 42. The securement tabs 52, 53 are preferably welded or otherwise relatively permanently secured to the side edges 54 thereby to maintain the integrity and assembly of a gasket element 40. Preferably, each of the sheet metal elements 48, 49 defines at least three securement tabs which are spaced around the periphery of their respective sheet metal elements to provide for stable securement of the sheet metal elements 48, 49 to the core 42.

Each of the embossments 50, 51 is provided with a captured filler to enhance the sealing capacity and the recovery characteristics of the gasket element 40. In the embodiment illustrated, flexible expanded graphite is provided in the concave recesses 56, 57 defined by the embossments 50, 51, respectively. The expanded graphite 58 at least fills the recesses 56, 57, and preferably substantially fills those recesses.

When the gasket assembly 10 is then positioned between the surfaces which it is intended to seal, the expanded graphite is trapped, and under compression, behaves somewhat like a trapped O-ring and provides substantial recovery as well as support for the embossments. This produces a highly effective seal in the zones of the embossments, thereby to minimize leakage possibilities at those zones.

The expanded graphite assists in providing an embossment of increased strength and temperature resistance, thereby to enhance the sealing effect of the sealing element 40 and the overall gasket assembly 10. Because the expanded graphite has a degree of resiliency and recovery, a long time, effective, temperature-resistant seal which does not require retorquing is provided. Also, because of the nature of the expanded graphite material, the gasket elements 40 exhibit very high temperature resistance characteristics, and a typical gasket, in accordance with the present invention, may well remain effective at temperatures of up to as high as 2700° F.

A suitable expanded, flexible graphite material is available from Calcarbon, a division of Polycarbon, Inc. under the name Calgraph A. A typical Calgraph A comprises a minimum of about 80% graphite and a maximum of about 20% ash at 950° C. (ASTM C-561) and has a density of about 70 pounds per cubic foot. The material is essentially devoid of binders, resins, fillers and additives. A like material is said by Union Carbide Corporation to be made in accordance with U.S. Pat. No. 3,404,061. Densities of from about 70 to about 85 pounds per cubic foot are preferred. The expanded graphite has a recovery of at least about 15 to 20% (70 pound density) to 40 to 50 percent (85 pound density) by ASTM F-38 Standards.

As stated, when they are to be used in an overall gasket assembly, the gasket elements 40 are proportioned to closely fit within openings 20 in the main gasket body 12. Main gasket body 12 may define a plurality of additional openings such as bolt holes 60. In one form, the sheet metal elements 48, 49 of gasket elements 40 may comprise projections such as projecting ears 62 which define means such as openings 64 adapted to be aligned with bolt holes 60. The provision of openings 64 which align with bolt holes 60, hence with the bolts later to be used, serves to assist in precisely locating the gasket elements 40 relative to the gasket assembly 10 upon installation of the gasket assembly. Alternatively, if gasket elements 40 are used independently of an overall gasket assembly 10, the openings 64, which receive the bolts which secure the two members to be sealed to each other, provides for precise location of the gasket elements relative to the connecting bolts hence to the members to be sealed, without adversely affecting clamping loads or the seal.

To simplify fabrication, it is also desireable to provide sheet elements 48, 49, which are identical. To that end, the securement tabs 52, 53 should be somewhat off-center, so that when the sheet elements 48, 49 are positioned, one beneath and one above the core 42, the securement tabs 52, 53 will not contact each other and will not interfere with the assemblage of the components of the gasket elements 40.

Gasket elements made in accordance with the present invention provide enhanced compressibility and recovery characteristics. The compressability can be varied to suit the particular application by changing the thickness of the metal core, the configuration of the embossed elements, the size of the embossments, and the volume of the flexible expanded graphite or other high temperature-resistant embossment filler. Changes in the density of the expanded graphite or other filler may also be made to vary the compressibility and recovery characteristics.

A further advantage of the gasket elements of the present invention is that the finished thicknesses can readily be changed simply by changing the thickness of the carbon steel insert or core, all without changing the compression and recovery characteristics of the gasket element. Finally, the gasket elements of the present invention are easily fabricated of simple, readily available materials which provide not only a gasket element which is easily fabricated and unified, but which provide gasket elements which may easily be secured with composite gasket assemblies. These characteristics provide substantial and significant advantages as compared to prior art gaskets, such as spiral wound gaskets which are currently available and widely used.

Although but one embodiment of the present invention has been shown and described in detail, it will be understood that various modifications and substitutions may be made by those skilled in the art without departing from the novel spirit and scope of the invention. Accordingly, the invention is intended to embrace all modifications within the scope of the appended claims.

What is claimed is:

1. A gasket of improved compressibility and recovery characteristics comprising
    a central annular core having upper and lower generally flat face portions,
    a first annular sheet member having an upwardly projecting annular embossment defining a concave recess facing said upper flat face portion,
    a second annular sheet member having a downwardly projecting annular embossment defining a concave recess facing said lower flat face portion,
    means securing said first and second sheet members to said core, and
    high temperature resistant filler material of relatively high recovery characteristics in each of said recesses and trapped in said recesses in confronting relation to said respective flat face portions.

2. A gasket in accordance with claim 1, and wherein said sheet members are metallic and define tab means which are secured to said core.

3. A gasket in accordance with claim 2, and wherein said sheet members are welded to said core.

4. A gasket in accordance with claim 2, and wherein said filler is expanded graphite.

5. A gasket in accordance with claim 4 and wherein said expanded graphite has a density of from about 70 to, about 85 pounds per cubic foot.

6. As gasket in accordance with claim 2, and wherein at least one of said sheet members defines projecting ears which define means for locating said gasket relative to bolts in the environments in which the gasket is to be used.

7. A gasket in accordance with claim 6 in which said locating means comprise bolt holes in said projecting ears.

8. A gasket assembly in accordance with claim 2 and wherein said sheet members are substantially identical.

9. A gasket in accordance with claim 3, and wherein said filler is expanded graphite and wherein at least one of said sheet members defines projecting ears which defines means for locating said gasket relative to bolts in the environment in which said gasket is to be secured.

10. A gasket assembly comprising a main gasket body defining at least one main gasket opening in which a gasket element is disposed for sealing a pair of elements defining openings in line with said main gasket opening, and wherein said gasket element comprises
    a central annular core having upper and lower generally flat face portions,
    a first annular sheet member having an upwardly projecting annular embossment defining a concave recess facing said upper flat face portion,
    a second annular sheet member having a downwardly projecting annular embossment defining a concave recess facing said lower flat face portion,
    means securing said first and second sheet members to said core, and
    high temperature resistant filler material of relatively high recovery characteristics in each of said recesses and trapped in said recesses in confronting relation to said respective flat face portions.

11. A gasket assembly in accordance with claim 10, and wherein said sheet members are metallic and define tab means which are secured to said core.

12. A gasket assembly in accordance with claim 11, and wherein said sheet members are welded to said core.

13. A gasket assembly in accordance with claim 11, and wherein said filler is expanded graphite.

14. A gasket assembly in accordance with claim 11, and wherein said main gasket body defines at least one bolt hole, and wherein at least one of said sheet members defines a projecting ear which defines an opening in line with said bolt hole for accurately locating said gasket element relative to said bolt hole and to a bolt in the environment in which the gasket assembly is to be used.

15. A gasket assembly in accordance with claim 14, and wherein said sheet members are substantially identical.

* * * * *